Jan. 10, 1928.
M. SPURLOCK
LAND VEHICLE
Filed Feb. 15, 1927
1,655,668
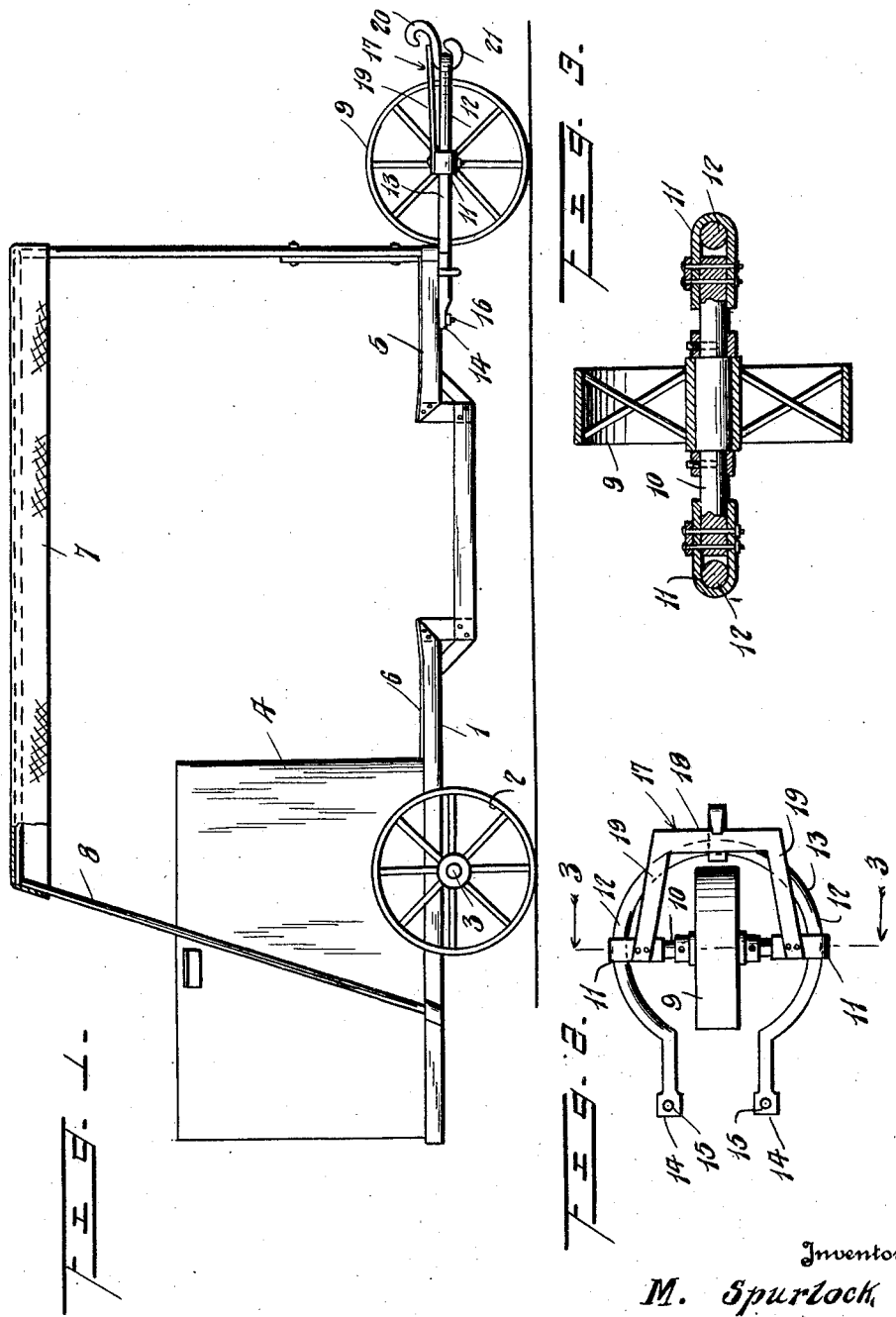

Patented Jan. 10, 1928.

1,655,668

UNITED STATES PATENT OFFICE.

MILEY SPURLOCK, OF WAGONER, OKLAHOMA.

LAND VEHICLE.

Application filed February 15, 1927. Serial No. 168,336.

This invention relates to new and useful improvements in wagons and has for its principal object to provide novel bearing and guiding means for the front wheel and front axle, whereby the wagon may be freely turned either to the right or left, as desired.

While my improvements are especially designed for use in connection with a wagon used to ride in, in picking cotton, it may be applied to any land vehicle where it may be used to advantage.

With the foregoing and other objects in view that will readily appear as the nature of my invention is better understood, the same consists in the novel features of construction, combination and arrangement of parts illustrated in the accompanying drawings and more particularly pointed out in the appended claims.

In the accompanying drawings, which are for illustrative purposes only and are therefore not drawn to scale:

Figure 1 is a side elevation, illustrating the application of my invention to a cotton picking wagon.

Figure 2 is a plan view.

Figure 3 is a front end view.

Referring to the drawings for a more particular description of my invention and in which drawings like parts are designated by like reference characters throughout the several views, 1 designates the chassis or frame, 2 the rear wheels, 3 the rear axle, 4 a hopper or box mounted on the chassis or frame in which the picked cotton is deposited, 5 and 6 the front and rear seats which are mounted on and carried by the chassis or frame, 7 the canvas top or cover of the wagon, 8 the skeleton supporting frame for the top or cover and 9 the front wheel of the wagon, which is revolubly mounted on the horizontal front axle 10.

In carrying out my invention, the front axle is provided at opposite ends, with inwardly bent substantially U-shaped straps or clips 11, which snugly engage and are adapted to ride back and forth on opposite sides, as 12, of the horizontal bearing and guiding frame 13. This frame is of substantially circular form with straight parallel laterally spaced ends 14 terminating in enlarged eyes or heads 15, which are bolted or otherwise fastened, as at 16, to the front end of the vehicle.

A substantially U-shaped frame 17, comprising a straight cross bar 18 disposed at the front and rearwardly extending diverging side members or legs 19, bolted at their outer or rear ends to opposite ends of the front axle, forms one element of my improvement and this frame is provided at its front end and center with a substantially S-shaped hook 20 to the upper end of which the clevis of the whiffletree (not shown) may be connected. The lower end, as 21, of said hook, engages and works back and forth on the front portion of the circular bearing and guiding frame 13 as the front wheel is moved to the right or left in turning the vehicle. This hook may be welded or otherwise secured at or near its center, to the front cross bar of the U-shaped frame.

In turning the front wheel to the right or left, the ends of the front axle are guided by the straps or clips 11 and the circular bearing and guiding frame 13 and the front wheel and axle thereby caused to turn at all times in the true arc of a circle.

While my improvement has been shown applied to a cotton picking wagon, it is to be understood that it may be used in connection with any other land vehicle desired.

From the foregoing description taken in connection with the drawings, it is thought that the construction, operation and advantages of my invention will be readily understood without requiring a more extended explanation.

Having described my invention, what I claim as new and desire to secure by Letters Patent, is:

1. In combination with the front wheel and front axle of a vehicle, a draft member secured to the axle, a substantially circular bearing and guiding frame, straps or clips at opposite ends of the axle engaging and working over adjacent sides of the bearing and guiding frame and a substantially S-shaped hook carried by the front end of the draft member with its lower end engaging and working over the adjacent portion of the aforesaid frame.

2. In combination with the front wheel and front axle of a vehicle, a substantially U-shaped draft member, secured at its ends to opposite ends of the axle, a substantially circular bearing and guiding frame secured at its ends to the front end of the vehicle, straps or clips at the ends of the axle engaging and working over adjacent sides of the aforesaid frame and a draft hook carried by the front end of the draft member, with its lower end engaging and working over the adjacent portion of the circular bearing and guiding frame.

In testimony whereof he affixes his signature.

MILEY SPURLOCK.